June 23, 1953  I. WILLIAMS  2,643,182
TREATING CHANNEL BLACK
Filed July 21, 1950
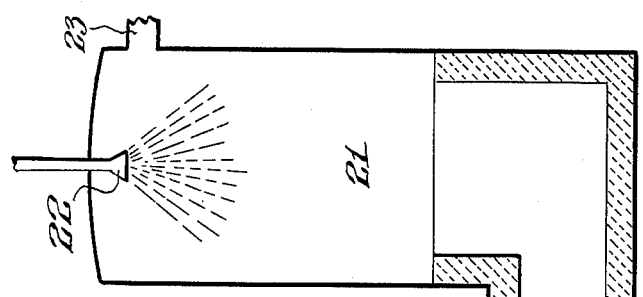
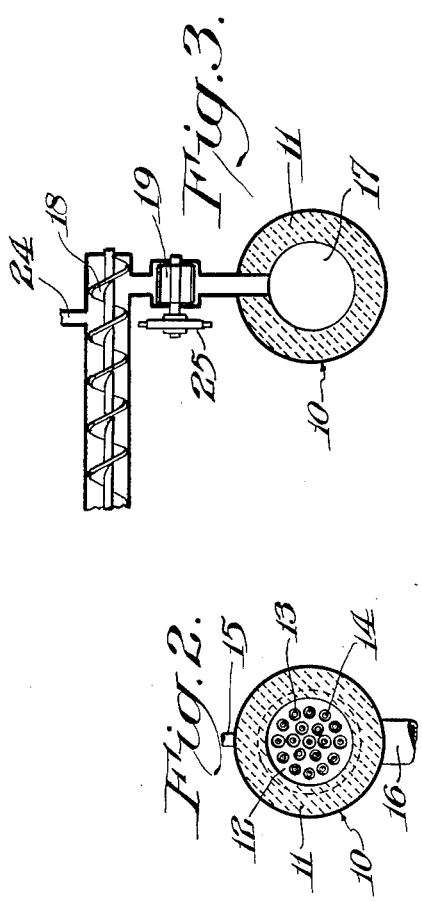
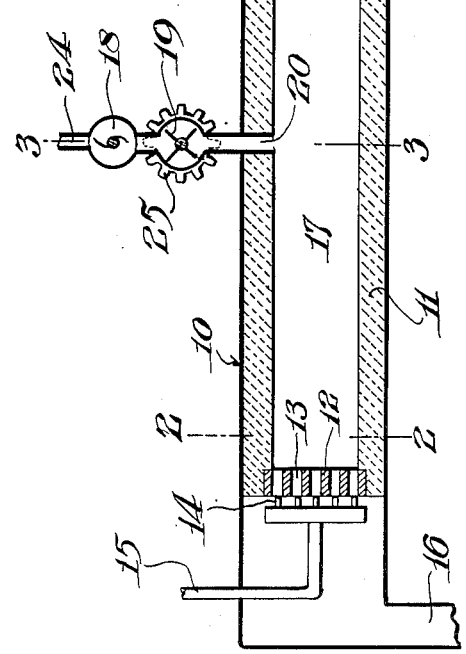
INVENTOR
IRA WILLIAMS
BY
Edwin C. Woodhouse
ATTORNEY Patented June 23, 1953

2,643,182

UNITED STATES PATENT OFFICE 2,643,182

TREATING CHANNEL BLACK

Ira Williams, Borger, Tex., assignor to J. M. Huber Corporation, Locust, N. J., a corporation of New Jersey Application July 21, 1950, Serial No. 175,177

3 Claims. (Cl. 23—209.6)

This invention relates to a process for treating channel black and, more particularly, to an improved process for calcining channel black to improve its usefulness as an ingredient in natural and synthetic rubbers.

Impingement carbons, such as channel black, are manufactured by causing small flames of burning gas to impinge upon relatively cool metal surfaces whereby they deposit carbon on the metal surfaces from which it is continuously removed and collected. Such carbons have been used almost universally for the compounding of natural rubber for tire tread stocks. Such stocks give excellent abrasion resistance and, in general, are quite satisfactory. However, impingement carbons normally have a considerable amount of other material absorbed or chemically bound on the surface of the particles, which material causes the carbon to exert a strong retarding action on vulcanization that is not desirable, especially when the stocks are used for the treads and sidewalls of small sized tires. GR-S synthetic rubber does not vulcanize in the absence of large amounts of a filler such as carbon black, and, under the best conditions, the rate of vulcanization is slow. The retarding action of channel black on the vulcanization of synthetic rubber is particularly objectionable.

Furnace carbon is made by the thermal decomposition of hydrocarbons, usually by burning the hydrocarbons in a furnace in a deficiency of air and collecting the carbon from the gases. Such furnace carbon is usually of coarser particle size than channel black and is inferior to channel black in many respects, but does not have the strong retarding action of channel black on vulcanization. Therefore, furnace carbon has found rather wide use in GR-S and like synthetic rubbers for the manufacture of tire tread stocks.

It is known that the materials absorbed or chemically bound on the particles of channel black can be removed or destroyed by heating the carbon for long periods of time at temperatures of 850° C. and above. Such methods are illustrated by Wiegand in Reissue 18,884 and by Foster et al. in Patent 2,495,925. Such methods are time consuming, expensive, and require bulky and costly equipment, materially increasing the cost of the product.

It is an object of the present invention to provide a novel and improved process for producing channel black of improved properties. A further object is to provide a process for producing a channel black which will impart high abrasion resistance to synthetic rubber. A still further object is to provide a channel black which will impart electrical conductivity to rubber. Another object is to provide an improved process for calcining channel black at high temperatures which process is easier and more economical to operate and which calcines the channel black more efficiently and rapidly. Other objects are to provide channel black of improved properties and to advance the art. Still other objects will appear hereinafter.

The above and other objects may be accomplished by my invention which comprises gradually feeding uncalcined channel black into a stream of hot inert gas having a temperature in the range of from about 1100° C. to about 2400° C., regulating the rate of feed of the channel black according to the volume of hot gas and the amount of heat available therein so as to immediately suspend the channel black substantially completely in the hot gas and to bring the resulting suspension to a temperature in the range of from about 850° C. to about 2000° C., maintaining the suspension at a temperature in the latter range for a period of from about 0.1 second to about 5 seconds, then cooling the suspension to below 800° C. and separating the carbon from the gas.

I have found that the materials, which are normally adsorbed or chemically bound on the surface of the particles of channel black and which act to retard the vulcanization of natural and synthetic rubbers containing it, are rapidly and efficiently removed by the process of my invention. In such process, the carbon is heated almost instantly solely by direct heat exchange with the hot inert gas and the large volume of moving gas constantly removes the undesired materials from the surface of the carbon particles and dilutes the carbon to such an extent that readsorption of such materials by the carbon does not take place when the suspension is cooled. The cleansing action of the moving hot gas is so efficient and rapid that the entire action is complete in from about 0.1 second to about 5 seconds. The speed of such cleansing action increases with increase in the temperature.

The channel black which is to be treated by my invention in uncalcined channel black, i. e., channel black which has not been treated to remove the materials normally adsorbed or chemically bound on the surfaces of the particles and hence contains the greater proportion of such materials. Preferably, I employ loose channel black which is as nearly as possible in the form in which it is scraped from the channels. However, the uncalcined channel black may be in compressed or pelletized form, if carbon with less reinforcing power for rubber is desired.

The temperature, at which the channel black should be calcined by my process, depends on the change which it is desired to make in the properties of the carbon. The channel black may be heated at temperatures in the range of from about 850° C. to about 2000° C. When channel black was heated to only 850° C. for as little as one second by my process, its retarding action on the vulcanization of rubber was considerably decreased. In most cases, higher temperatures are desirable and temperatures up to 2000° C. may be used conveniently. Preferably, I calcine the channel black at temperatures in the range of from about 1100° C. to about 1550° C.

The time, during which the channel black is heated in my process to produce the desired calcining, will usually be from about 0.1 second to about 5 seconds, the time employed in any case being dependent upon the temperature employed and the change desired in the properties of the carbon. Any desired change will be obtained in less time at the higher temperatures than at the lower temperatures. On commercial scale, satisfactory results have been obtained at treatment times ranging from 0.4 second to 5 seconds. Treatment times, somewhat greater than 5 seconds, may be employed but without advantage and such longer times require uneconomically bulky and expensive equipment. At temperatures of about 1100° C. and above, and, particularly, at temperatures in the range of from about 1100° C. to about 1550° C., the preferred time of heating will be from about 0.1 second to about 2 seconds.

The inert gases, which are to be employed in my process, are nitrogen, hydrogen, carbon monoxide or combustion gases, which are substantially free of oxygen. Preferably, I employ ordinary combustion gases resulting from the combustion of a hydrocarbon gas or oil with an oxygen-containing gas such as air and in which the oxygen-containing gas was employed in the proportion of from about 25% to about 100% of that required for complete combustion of the hydrocarbon. The mixture of nitrogen, hydrogen, carbon dioxide, carbon monoxide and water vapor, which results from the manufacture of carbon black by partial combustion of a hydrocarbon in a furnace, is quite satisfactory. Such latter mixture is conventionally obtained by burning a mixture of a gaseous hydrocarbon and an oxygen-containing gas, in the proportion of from about 25% to 80% of that required for complete combustion of the gaseous hydrocarbon.

The inert gases may be heated in a suitable heat exchanger and then passed through a suitable chamber where the channel black is introduced into such stream of gas passing through such chamber. Preferably, however, the hot inert gases are combustion gases which are formed at or near one end of an uncooled, elongated, unobstructed reaction chamber and passed through such chamber without cooling while gradually feeding the uncalcined channel black into the stream of hot combustion gases passing through such chamber.

A particularly desirable procedure comprises injecting the uncalcined channel black into the hot mixture of carbon and combustion gases, produced in furnaces manufacturing furnace carbon. Preferably, the channel black will be introduced into the hot combustion mixture in the reaction chamber when the combustion is substantially complete, that is, at a point just downstream from that at which the formation of the furnace carbon is substantially complete. The mixture of carbon and combustion gases, produced in the manufacture of furnace carbon, is usually at a temperature in the preferred range for my process. Such mixture of carbon and gases is particularly favorable for my process because an equilibrium has been reached between the various chemical components thereof and hence no chemical effect will be produced on the channel black which is injected into such mixture. The product, so obtained, is a mixture of calcined channel black and furnace carbon which is perfectly blended, and the properties of the resulting product can be varied in an easily controlled manner by regulating the amount of channel black which is injected.

The temperature of the stream of hot inert gas, into which the channel black is injected, may be from about 1100° C. to about 2400° C., and, preferably, from about 1300° C. to about 2000° C. The channel black, which is to be injected into the stream of hot inert gas, will usually be at from about atmospheric temperature to about 100° C. The channel black may initially be at lower or higher temperatures but without advantage and, if it is attempted to employ the channel black at temperatures as high as 400° C. or higher, there is danger of altering its crystalline structure and damaging its desirable properties due to heating for excessive periods of time.

The rate of feed of the channel black into the stream of hot inert gas will be regulated, according to the volume of the hot gas and the amount of heat available therein, so as to suspend the channel black in the hot gas and to bring the resulting suspension to a temperature in the range desired for calcining the channel black. Since the heat, required to raise the temperature of the channel black, is taken directly and solely from the hot inert gas, it is necessary that the hot gas be employed in sufficient volume to supply the required amount of heat. The average amount of heat, available from combustion gases over my preferred range of temperatures of about 1100° C. to about 1550° C., is about 10 gram calories per cubic foot of gas at normal temperature and pressure per degree centigrade. If the gas is supplied at 1480° C. and is cooled by the channel black to 1150° C., a drop of 330° C., the heat available would be 3300 gram calories per cubic foot. The mean specific heat of channel black over the range of 100° C. to 1150° C. is about 0.34 gram calories per gram or about 154 gram calories per pound. If the rise in temperature of the channel black is 1050° C. (from 100° C. to 1150° C.), the amount of heat required would be 154×1050, or 161,700 gram calories per pound of channel black. The calculated volume of hot combustion gas at 1480° C., which would be required to provide the amount of heat to so raise the temperature of channel black, would be $$\frac{161700}{3300} = 49$$

cubic feet measured at normal pressure.

Usually, at least 30 cubic feet of hot gas is employed for each pound of channel black or, stated another way, not more than one pound of channel black is injected into each 30 cubic feet of hot gas. Large scale runs have been made quite satisfactorily wherein the channel black has been injected in the proportion of one pound for as little as 35 cubic feet of hot inert gas. The volume of gas may be as great as desired, and the maximum volume will be limited solely by economic and practical considerations. The actual volume of gas will vary with the composition of the gas, the heat capacity of the gas, the temperature of the gas, and the apparatus employed. Different gases have different heat capacities. Also, if the gases contain water vapor or carbon dioxide, some of the carbon will be burned and produce heat. Furthermore, if the calcining chamber is not well insulated, considerable heat will be lost by conduction and radiation. However, the process is most easily controlled and regulated by placing any suitable temperature recording device near the exit end of the reaction chamber and regulating the amount of channel black injected into the chamber so that the resulting suspension has the temperature desired for calcining the channel black. The volume of hot gas, required to calcine the channel black within temperature ranges heretofore specified, will be sufficient to completely suspend all of the channel black injected into it, provided that the channel black is injected at a gradual rate rather than in large lots.

The process of my invention may be more readily understood by reference to accompanying drawings which illustrate one suitable type of apparatus and mode of operating the process. In the drawings, Figure I is a vertical cross sectional view of a horizontal furnace illustrated diagrammatically; Figure II is a vertical cross section on line 2—2 of Figure I, showing the face of the burner block; and Figure III is a vertical cross section taken on line 3—3 of Figure I, showing one suitable means for injecting channel black into the stream of hot inert gas.

The reaction tube 17 of the furnace is formed by a ceramic lining 11 enclosed in a metal shell 10. A ceramic burner block 12 is located at one end of the reaction tube and contains multiple openings 13. A pipe 15 supplies fuel gas to burner nozzles 14 which are directed to inject the gas into openings 13 in the burner block. Air, for combustion of the gas, is supplied through pipe 16. The amount of air may be regulated so that the gas is completely burned and the combustion gases are free of carbon, or so that the gas is only partially burned and the combustion gases contain furnace carbon.

Uncalcined channel black is supplied through pipe 24 and conveyed at a consistent rate by the screw conveyor 18 to the star valve 19. The star valve 19 is rotated slowly by means of a sprocket 25, operated by a chain and suitable power source, not shown. The operation of the star valve 19 drops the channel black through tube 20 into the reaction chamber 17 and into the stream of hot inert gases passing therethrough. The resulting suspension of channel black in hot combustion gases continues to pass through the chamber 17 without substantial cooling, other than that produced by the exchange of heat between the channel black and the hot gases. The suspension of channel black and hot gases finally pass out of the exit end of the tube 17 and into a tower 21 where they are cooled to below 800° C. by means of a water spray provided by the sprayer 22. The cool suspension passes out of the tower 21 through pipe 23 at the upper end thereof and then to carbon collecting means, not shown, which may be of any conventional type.

In order to more clearly illustrate my process, preferred modes of carrying the same into effect, and advantageous results to be obtained thereby, the following examples are given:

*Example I*

A furnace was employed which was similar to that shown in the drawings and in which the ceramic tube was 23 feet long and 6 inches in diameter. 203 cubic feet of air and 19.8 cubic feet of natural gas were burned per minute through the burner located at the end of the furnace. The temperature of the combustion gas, three feet from the burner, was 1485° C. Fluffy uncalcined channel black was injected at a distance of 3.5 feet from the burner at the rate of 2.57 pounds per minute. The temperature of the carbon laden gas, just before cooling with a water spray, was 1255° C. The total time, during which the carbon was treated, was about .7 second.

Tire tread stocks were prepared from samples of the same lot of carbon, before and after treating, and the abrasion resistance was measured. The tire tread stocks were compounded according to the following formula and vulcanized at 300° F.

| | Parts |
|---|---|
| GR–S synthetic rubber | 100.0 |
| Carbon | 50.0 |
| Zinc oxide | 5.0 |
| Stearic acid | 1.5 |
| Accelerator | 1.0 |
| Sulfur | 1.8 |
| Mineral oil | 7.5 |

The stock, containing untreated carbon, lost 17.3 cc. during the abrasion period; while that, containing the treated carbon, lost only 10.3 cc. The electrical resistance of the tire tread stock, compounded with the untreated carbon, was over 2,000,000 ohms per cubic centimeter, while the resistivity of the stock, compounded with the treated carbon, was 575 ohms per cubic centimeter.

*Example II*

The furnace of Example I was used. 130 cubic feet of air and 35 cubic feet of natural gas was burned per minute to produce 1.1 pounds of furnace carbon per minute. A sample of this furnace carbon was collected. The temperature of the carbon laden gas, 3 feet from the burner, was 1320° C. Fluffy, uncalcined channel black was introduced into the combustion mixture at the rate of 1.1 pounds per minute. The temperature of the resulting mixture, before quenching, was 1190° C. A sample of the mixed carbon was made into a tire tread stock with natural rubber according to the following formula and vulcanized at 287° F.

| | Parts |
|---|---|
| Smoked sheets (natural rubber) | 100.0 |
| Carbon | 50.0 |
| Zinc oxide | 5.0 |
| Stearic acid | 3.0 |
| Pine tar | 3.0 |
| Sulfur | 3.0 |
| Mercaptobenzothiazole | 1.0 |

The time of vulcanization, required to produce the maximum tensile strength, was found to be 30 minutes. A mixture of 1 part of the furnace carbon, made by burning natural gas in the furnace, and 1 part of untreated channel black was made into the same tire tread stock and the time of vulcanization, required to produce maximum tensile strength, was found to be 55 minutes. The tire tread stock, prepared from the mixture of furnace carbon and untreated channel black, had a very high electrical resistance, while the stock, prepared from the mixture containing the treated channel black, was a relatively good conductor of electricity.

*Example III*

Fluffy, uncalcined channel black was treated in the furnace and according to the procedure of Example I at feed rates of 1.5, 3 and 5 pounds of carbon per minute. Each treated carbon was made into a tire tread stock with natural rubber, employing the formula and vulcanizing temperatures of Example II. The electrical resistivity of each vulcanized stock was measured. The stock, containing untreated channel black, had a resistivity of 2,700,000 ohms per cubic centimeter; while the stocks, prepared from the 1.5, 3 and 5 pound samples, had resistivities, respectively, of 431, 687 and 1020 ohms per cubic centimeter.

It will be understood that the drawings and the preceding examples are given for illustrative purposes solely and that my invention is not limited to the specific embodiments disclosed therein. The type and structure of apparatus have been and may be widely varied. In some cases, the cross section of the reaction tube was increased by increasing the diameter thereof by about 50%, starting about two feet beyond the point at which the channel black was introduced. In other cases, the channel black was introduced into the combustion mixture in commercial furnaces producing furnace black. In some of the latter cases, channel black, substantially equal in weight to the furnace carbon, was introduced into commercial furnaces producing high abrasion furnace black from oil. Also the furnaces may be constructed so that the flow of the stream of hot inert gas and the suspension is vertical, either upward or downward. The temperatures and times of treatment may be further varied within the ranges hereinbefore indicated. Other inert gases may be substituted for the combustion gases. The uncalcined channel black employed may be in compressed, compacted, or pelletized form, and, in such cases, the longer treatment times will be required to produce the optimum results.

It will be apparent that, by my invention, I have provided a simple, easily regulated and economical process for efficiently calcining channel black to improve its properties, which process employs relatively simple, common and readily available equipment. By my process, the channel black is effectively calcined at a rapid rate and without subjection to high temperatures for long periods of time, whereby there is little or no danger of damaging the desired physical properties and crystalline structure of the carbon or graphitizing the carbon. Therefore, it will be apparent that my invention constitutes a valuable advance in and contribution to the art.

I claim:

1. The process which comprises introducing into one end of an uncooled elongated unobstructed reaction chamber a burning mixture of a gaseous hydrocarbon and an oxygen-containing gas in the proportion of from about 25% to 80% of that required for complete combustion of the gaseous hydrocarbon, passing the burning mixture through the reaction chamber and forming furnace carbon black suspended in a mixture of hot combustion gases in the reaction chamber, gradually feeding uncalcined channel black into the hot combustion mixture in the reaction chamber when the combustion and the formation of furnace carbon black are substantially complete, the rate of feed being such that each pound of channel black is introduced into at least 30 cubic feet of the hot combustion mixture and regulating the rate of feed of the channel black according to the volume of the hot combustion mixture and the amount of heat available therein so as to immediately suspend the channel black substantially completely in the hot combustion mixture and to bring the resulting suspension to a temperature in the range of from about 850° C. to about 2000° C., continuing the passage of the suspension through the reaction chamber while maintaining the suspension at a temperature in said range for a period of from about 0.1 second to about 5 seconds, then removing the suspension from the reaction chamber and cooling it to below 800° C., and separating a mixture of calcined channel black and furnace carbon black from the gas.

2. The process which comprises introducing into one end of an uncooled elongated unobstructed reaction chamber a burning mixture of a gaseous hydrocarbon and an oxygen-containing gas in the proportion of from about 25% to 80% of that required for complete combustion of the gaseous hydrocarbon, passing the burning mixture through the reaction chamber and forming furnace carbon black suspended in a mixture of hot combustion gases in the reaction chamber, gradually feeding uncalcined channel black into the hot combustion mixture in the reaction chamber when the combustion and the formation of furnace carbon black are substantially complete, the rate of feed being such that each pound of channel black is introduced into at least 30 cubic feet of the hot combustion mixture and regulating the rate of feed of the channel black according to the volume of the hot combustion mixture and the amount of heat available therein so as to immediately suspend the channel black substantially completely in the hot combustion mixture and to bring the resulting suspension to a temperature in the range of from about 1100° C. to about 1550° C., continuing the passage of the suspension through the reaction chamber while maintaining the suspension at a temperature in said range for a period of from about 0.1 second to about 5 seconds, then removing the suspension from the reaction chamber and cooling it to below 800° C., and separating a mixture of calcined channel black and furnace carbon black from the gas.

3. The process which comprises introducing into one end of an uncooled elongated unobstructed reaction chamber a burning mixture of a gaseous hydrocarbon and an oxygen-containing gas in the proportion of from about 25% to 80% of that required for complete combustion of the gaseous hydrocarbon, passing the burning mixture through the reaction chamber and forming furnace carbon black suspended in a mixture of hot combustion gases in the reaction chamber, gradually feeding uncalcined channel black into the hot combustion mixture in the reaction chamber when the combustion and the formation of furnace carbon black are substantially complete, the rate of feed being such that each pound of channel black is introduced into at least 30 cubic feet of the hot combustion mixture and regulating the rate of feed of the channel black according to the volume of the hot combustion mixture and the amount of heat available therein so as to immediately suspend the channel black substantially completely in the hot combustion mixture and to bring the resulting suspension to a temperature in the range of from about 1100° C. to about 1550° C., continuing the passage of the suspension through the reaction chamber while maintaining the suspension at a temperature in said range for a period of from about 0.1 second to about 2 seconds, then removing the suspension from the reaction chamber and cooling it to below 800° C., and separating a mixture of calcined channel black and furnace carbon black from the gas.

IRA WILLIAMS.

References Cited in the file of this patent

UNITED STATES PATENTS

| Number | Name | Date |
|---|---|---|
| Re. 18,884 | Wiegand | June 27, 1933 |
| 1,475,502 | Manning | Nov. 27, 1923 |
| 2,368,828 | Hanson et al. | Feb. 6, 1945 |
| 2,486,205 | Prosk | Oct. 25, 1949 |
| 2,495,925 | Foster | Jan. 31, 1950 |

FOREIGN PATENTS

| Number | Country | Date |
|---|---|---|
| 118,922 | Australia | Sept. 5, 1944 |